United States Patent [19]

Mäkitalo et al.

[11] 3,954,452
[45] May 4, 1976

[54] PROCESS FOR SEPARATING CD FROM ZN BY CEMENTATION

[75] Inventors: Valto Johannes Mäkitalo; Launo Leo Lilja, both of Pori; Sigmund Peder Fugleberg, Kokkola, all of Finland

[73] Assignee: Outokumpu-Oy, Helsinki, Finland

[22] Filed: Feb. 25, 1974

[21] Appl. No.: 445,078

[30] Foreign Application Priority Data
Feb. 26, 1973 Finland .................. 573/73

[52] U.S. Cl. ................... 75/109; 75/121; 266/101
[51] Int. Cl.² .............. C22B 17/04; C22B 3/02
[58] Field of Search .......... 75/109, 121; 266/22

[56] References Cited
UNITED STATES PATENTS 2,245,217   6/1941   Mowlds .................. 75/109
3,806,103   4/1974   Martini et al. ................ 75/109 X

*Primary Examiner*—G. Ozaki

[57] ABSTRACT

Materials dissolved in water are separated from each other by means of a cementation agent. The materials treated are those having a greater hydrogen overpotential than the potential difference between the cementation agent and hydrogen gas. A water solution of material to be cemented is fed upwards to a reaction zone through a bed containing the cementation agent, and agglomerates produced sink from the bed to be crushed in a zone below the bed.

The addition of a flocculation agent to the reaction zone causes the material to cement as smooth-surfaced particles which do not adhere to each other or allow large gas bubbles to grow attached to the particles.

5 Claims, 7 Drawing Figures

PROCESS FOR SEPARATING CD FROM ZN BY CEMENTATION

BACKGROUND OF THE INVENTION

The present invention relates to a process for separating from each other materials dissolved in water by means of a cementation agent in the presence of substantial amounts of only such materials as have a hydrogen overpotential higher than the potential between the cementation agent and hydrogen gas, the cementation agent being less inert than hydrogen, and to a device for applying the process according to the invention. This invention particularly relates to a process for the cementation of cadmium by means of zinc.

The raw material generally used in an electrolytic zinc process is a sulfidic zinc concentrate, which is first roasted and then the roasted product is leached with return acid from the electrolysis and the obtained product is an impure zinc sulfate solution. This solution contains about 150 g of zinc/l and varying amounts of the components present in the concentrate. The purpose of the further treatment of the solution is to separate the zinc from these impurities In principle this is achieved in three stages. At the first stage, the solution is neutralized, in which case the hydroxides not as easily soluble as zinc hydroxide are precipitated and separated. At the second stage, the metals more noble than zinc are cemented from the solution by a zinc powder treatment according to the following reaction:

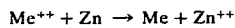

At the third stage, the zinc is separated from the solution by electrolytic precipitation and the components less noble than zinc remain in the solution.

The number of components precipitating at the second stage is great, but the most important ones are usually copper, cadmium, cobalt, nickel, arsenic, and antimony. These must be removed quite completely, partly because they precipitate together with zinc in the electrolysis and thereby yield an impure product, and partly because they act as poisons in the electrolysis and develop hydrogen gas at the cathode in place of zinc precipitation. In addition, copper and cadmium are of an economic importance and they are refined further. Even though these components are considerably more noble that zinc, only copper, cadmium, arsenic, and antimony can be simply cemented by means of zinc powder alone. Cobalt and nickel can, however, be also cemented by using certain additives, and those must commonly used are arsenic and antimony, which are usually added into the solution as trioxides. While these additives accelerate the cementation of cobalt and nickel, they have an opposite effect on the cementation of cadmium. This is most likely because these elements lower the hydrogen overpotential on cadmium (as well as on zinc), in which case the reaction $Cd + 2H^+ \rightarrow Cd^{++} + H_2$ is catalyzed, which makes the cadmium more difficult to reduce into a metallic form; and even if this happens, the metal easily redissolves. This effect of arsenic and antimony on cadmium is also greatly strengthened at a raised temperature, while the cementation of cobalt and nickel is considerably facilitated. Two different methods are therefore used in processes in which arsenic or antimony is added to cement cobalt and nickel. In the first one, a low temperature (about 70° C) is used, which makes it possible to precipitate all impurities simultaneously. This requires, however, a great zinc powder surplus to completely cement the cobalt and nickel as well as a relatively long reaction period. Also, by this method a precipitate is obtained which contains a great deal of metallic zinc and little cadmium; this increases the amount of solution in the cadmium process in which this precipitate constitutes the raw material and in which both the zinc and the cadmium are brought into solution.

In the second method, the above conformities to law are applied so that a high temperature (above 90° C) is used for accelerating the cementation of cobalt and nickel, while the cadmium can be simultaneously kept almost completely in the solution. The cadmium can be then precipitated at a second stage in the absence of impurities which lower the hydrogen overpotential on cadmium. In this case a relatively low zinc powder surplus is sufficient and a precipitate is obtained which has a considerably better cadmium/zinc ratio than in the former method.

Even though in the second method the necessary zinc powder consumption is lower than in the first one and even though the obtained cadmium cementate has a good zinc/cadmium ratio in comparison with the first process, the zinc surplus is, however, usually about 500 % of the equivalent amount. In this case the requisite solution volume in cadmium production is also five times what would be theoretically necessary. This high zinc powder surplus is required partly for obtaining a moderate reaction period but also partly for keeping the $Cd^{++}$ content low enough in the solution (to prevent the reoxidation of cemented cadmium).

When cadmium is cemented from the "purified" solution described above, obtained, for example, by cementing all other impurities by the second method, the main reaction is as follows:

$$Cd^{++} + Zn \rightarrow Cd + Zn^{++} \qquad (1)$$

This reaction follows the formula

in which
$-(dC_{cd}/dt)$ = cemented cadmium per time unit
$k$ = reaction velocity constant
$A$ = surface area of zinc powder (amount of zinc powder)
$V$ = volume of solution (volume of reactor)
$C_{cd}$ = cadmium concentration at a given time
$A/V$ = concentration of zinc powder Formula 2 indicates that with a certain A/V ratio a shorter reaction period is obtained in a batch process than in a continuous-working system (when $C_{cd} \rightarrow 0$), when the average $C_{cd}$ is higher in a batch process. In most zinc processes according to the second method, the batch process is the most common, and usually a compromise is made between the values A and V, so that the reaction period is about 1 – 1½ hours, in which case the above-mentioned quintuple zinc powder surplus is required. The compromise leads to a reaction volume of about 600 m³ when the production is 100,000 tons of zinc a year. Formula 2 also indicates that if reaction 1 is carried out according to the countercurrent principle, adjustment must always be made to the effect that the additional expenses due to the zinc powder are balanced by a lower reactor volume when the A/V ratio rises.

The countercurrent principle is used to some extent in continuous-working processes according to the first method (AIME World Symposium on Mining and Metallurgy, 1970, Lead & Zinc, pp. 208–9 and 239). In this manner, the zinc powder consumption can be also diminished since the last stage, into which the zinc powder is added, has a low cadmium content and at that stage it is easier to obtain a sufficient zinc surplus for producing a pure solution. The gained advantages are, however, very small in conventional processes.

SUMMARY OF THE INVENTION

The object of the present invention is to provide a process for separating from each other materials dissolved in water by means of a cementation agent, especially for cementing cadmium by means of zinc in the presence of substantial amounts of only such components as have an hydrogen overpotential (absolute value of the overpotential) that is greater than the potential difference (the absolute value of the potential difference) between the cementation agent and hydrogen gas, the cementation agent being less inert than hydrogen, so that the consumption of the cementation agent is almost stoichiometric, and the product of the process is a precipitate almost devoid of the cementation agent. An additional object of the invention is to provide a device meant for applying the process according to the invention.

According to the invention there is provided a process in which a water solution of the material or materials to be cemented is fed in the reaction zone through a bed containing the cementation agent, and the agglomerates produced in the cementation are crushed.

DESCRIPTION OF THE PREFERRED EMBODIMENTS

Figure 1:
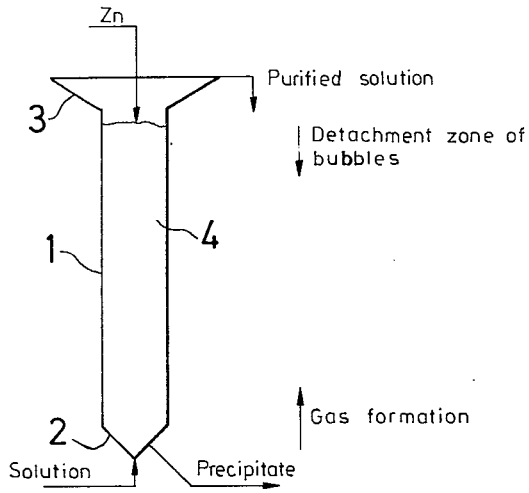
FIGS. 1 – 7 show schematically vertical, sectioned graphs of the various embodiments of the invention, of which the device according to FIG. 7 has been noted the most advantageous.

The invention is based on the idea that the ratio A/V can be considerably raised if the reaction takes place in a system working according to the countercurrent principle and the zinc powder is kept in the system, in other words, a $Cd^{++}$ containing solution is allowed to flow through a zinc powder bed, in which the cementation takes place. In such a system it is theoretically possible to allow the solution to flow through the bed until all the zinc powder has been consumed and a pure Cd precipitate is obtained from the system. In principle, one stage in the desired system is then as follows:

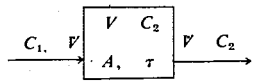

in which $V$ = volume flow, $\bar{V}$ = volume of stage, $A$ = surface area of zinc powder amount, $\tau$ = delay period, $C = Cd^{++}$ content. Formula 2 can be now written as follows:

$$\frac{C_1-C_2}{\tau} = K \cdot \frac{A}{\bar{V}} \cdot C_2 \qquad (3)$$

and when $$\tau = \frac{\bar{V}}{V}$$

$$C_1-C_2 = k \cdot \frac{A}{V} \cdot C_2 \qquad (4)$$

or $$C_2 = \frac{C_1}{k\frac{A}{V}+1} \qquad (5)$$

This indicates that the efficiency of the stage ($C_1:C_2$) is dependent only on the zinc powder surface area (amount), A, when a certain volume flow, V, loads the element, and the efficiency is thereby independent of the volume as long as the volume is sufficient for producing the conditions under which the chemical reaction can take place without hindrance or under which the solution and the zinc powder are completely mixed.

If this stage constitutes the practical process, or part of it, in which the above-mentioned cementation of cadmium from a zinc sulfate solution containing cadmium must be carried out, there are also further requirements: (1) $[Cd^{++}] \rightarrow 0$ (i.e., less than 1 mg/l) (2) the cemented cadmium must be removed from the system, preferably in as concentrated a form as possible, which also means that new zinc powder must be added to replace the consumed amount. Nevertheless, both a pure solution and a 100 % cadmium precipitate cannot be obtained by a process which has only one stage because a certain surplus of metallic zinc is always necessary in the system for cementing the cadmium from the solution. To obtain the above conditions, at least two elements are thus required in the system, in which case precipitate is removed from the first one and the solution is finally purified in the second one. In addition, a pure solution is obtained with a considerably lesser amount of zinc powder if the process is divided into several stages. While the $Cd^{++}$ content of this stage is usually lowered in a zinc process to 1/1000 of the original concentration, in a two-stage process 2/10 of the amount necessary in a one-stage process is sufficient, and in three stages this amount decreases to 3/100; this decreases the requisite reaction volume and the energy requisite for keeping the solid phase and the solution well mixed.

Two things are required in a practical application of the above stage of the system:

good mixing so that as much as possible of the cementing surface area (zinc powder) is active;

separation of the solution and the precipitate (zinc powder) so that the precipitate remains in the reaction zone.

Since the specific weight of zinc powder is considerably greater than that of the solution, the best system would be a fluidized-bed system. The performed trials indicated, however, that when cadmium was cemented, a very strong agglomeration tendency was produced on the zinc powder surface, in which case the cementing surface was decreased considerably, fluidization could not be achieved, and the bed was finally completely sintered. Slight generation of hydrogen gas appeared on the zinc powder as a secondary reaction. The outcome was that when the bubbles grew large enough, they frothed the zinc powder out of the reactor.

It proved necessary to provide a crushing device for comminuting the produced aggregates and a device for separating the phases zinc hydrogen gas-solution. This can be obtained in, for example, a reactor provided with mixing followed by a settler and continuous return of the precipitate from the settler to the reactor. For best results, the delay period of the precipitate in the settler must be as short as possible so that it will not be frothed out of it owing to hydrogen gas generation.

By the process according to the invention it is possible to cement such materials as have a hydrogen overpotential higher than the potential difference between the cementation agent and hydrogen gas, the cementation agent being less inert than hydrogen. By the process according to the invention it is thus possible to economically cement, for example, cadmium by means of zinc, or lead and/or mercury by means of cadmium or zinc.

In a highly preferred embodiment of the invention, an additive added to the reaction zone, such as a flocculation agent or some colloid which causes the material to be cemented to cement in very smooth-surfaced particles so that the particles cannot form agglomerates and that large gas bubbles which could flotate the solid out of the reactor cannot grow on the particle surfaces.

It is very advantageous to fluidize the bed of solid by means of an upward flow of the water solution, in which case the produced agglomerates sink, owing to their greater weight, to the lower part of the reaction zone, where the agglomerates can be crushed and returned to the bed as a fine-grained solid.

FIG. 1 shows a reactor 1 which is continuous-working in regard to both the solid and the water solution. It has a lower part 2 which widens conically upwards, into which the solution is fed, and from which precipitate is removed. The upper part 3 of the reactor 1 also widens conically upwards and a pure solution is removed as an overflow from it and zinc powder is added into it. The bed of solid 4 in the reactor 1 is, owing to a continuous addition of zinc powder and a continuous removal of precipitate, in a continuous slow revolving motion, which prevents the bed 4 from channeling.

Figure 2:
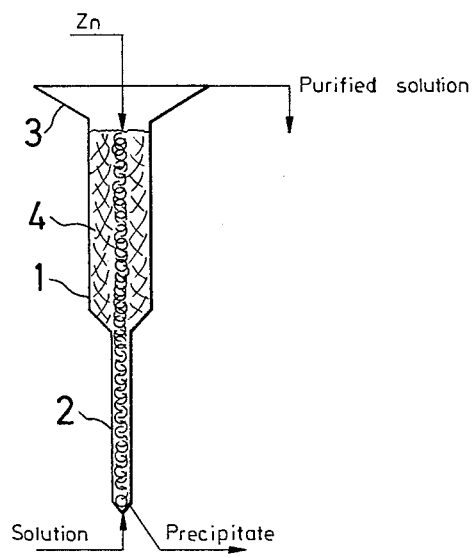

In the embodiment illustrated in FIG. 2, the lower part 2 of the reactor has been greatly narrowed to bring the bed 4 into so strong a movement in this part 2 that agglomerates will not be produced; the agglomeration tendency is very strong at the water solution feed point. This embodiment had, however, a disadvantage in that the middle part of the reactor 1 was divided into two zones, namely, a fluidization zone in the middle of the reactor 1 and of the size of the lower part 2, and a surrounding solid-bed zone which was not penetrated by the water solution flow. An accumulation of the reaction gases also caused heterogeneity in the bed.

Figure 3:
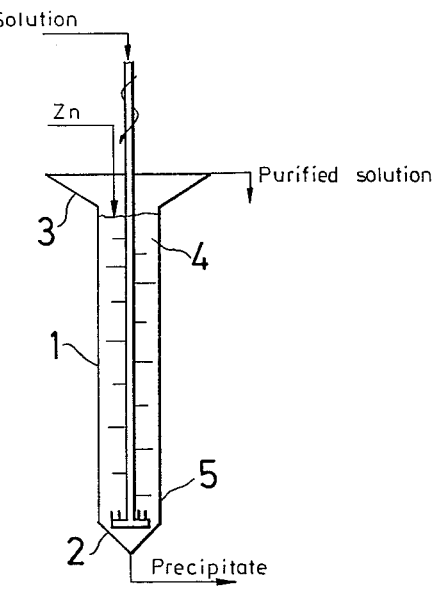

To eliminate the above difficulties, a fluidized-bed reactor 1 according to FIG. 3 can be used. Its lower part 2 has been provided with a mixer 5 which can be rotated around its vertical axis and the blades of which have been perforated so that the water solution can be fed through the shaft and the blades of the mixer 5 into the lower part 2 of the reactor 1. In this embodiment, a homogeneous bed is obtained and, owing to the efficient mixing, agglomerates cannot be produced at the water solution feed point.

Figure 4:
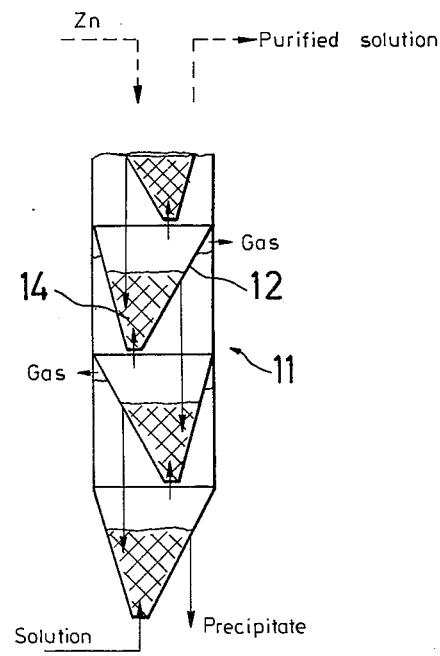

FIG. 4 illustrates a multiple-fluidized-bed reactor 11, in which several conical units 12 have been placed one on top of the other so that the solid can move, according to the overflow principle, from one unit to another unit 12 below, countercurrently in relation to the solution, which flows into each unit 12 through the opening of its lower end and then through the bed 14 in the unit 12 into the next unit 12 above. It was noted, however, that this device only worked within a very narrow solution flow rate range.

Figure 5:
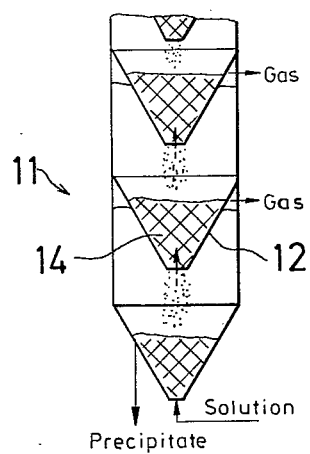

A more dependable flow of the solid through the multiple-fluidized-bed reactor 11 was obtained by using a device according to FIG. 5, in which the solution comes to the bed of solid 14 through an opening or openings so large that it or they will let the bed particles through. Normally the solution flow is so great the the bed 14 cannot sink through the opening or openings of the unit 12. By suitably decreasing the flow velocity of the solution, part of the solid material is caused to sink periodically into the layer below.

Figure 6:
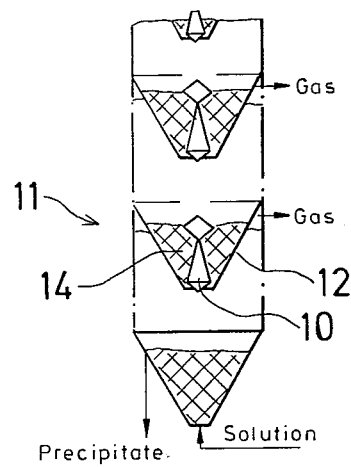

Since the quality of the bed particles has an effect on their sinking velocity, their amount tends to vary in the various layers 12. For this reason the bed layers were provided with floats 10 according to FIG. 6; their upper parts floated on the surfaces of the bed 14 and their lower parts regulated the solution inlet and the flow velocity. At the same time their movement improved the mixing of the bed 14.

The conical shape of the control unit 12 provided the advantage that gas buddles produced in the lower bed layer 14 could be dirercted out of the reactor 11 from the outer surface of the cone 12.

Control units 12 could be coupled on top of each other and side by side, according to the requirements of the process.

The problem in cadmium cementation is the agglomeration of the Zn bed and the generation of reaction gases. The mechanism of these phenomena could be influenced by adding to the bed a material which caused the Cd to precipitate in smooth-surfaced particles, e.g., a flocculation agent or some colloid.

The agglomerates produced in the fluidized bed sink to the lower part of the reactor, where a growing, immobile, and channeling area is produced. Additional energy is required for breaking these agglomerates. Different alternatives were tested for bringing energy into the system (strong, short-time pressure impulses given to the lower part of the reactor, etc.). Those which had a harmful effect on the flow conditions in the bed had to be rejected. The outcome of the tests was a device according to FIG. 7 which meets the incurred requirements concerning, among other things, the crushing and the mixing area height.

The crushing effect in the reactor 1 is thus obtained by a low-range crusher 5 and baffles 6. The height of the baffles 6 has been adjusted so that a slight revolving motion is obtained in the bed part 4 above them. This has improved the distribution of the solution and the mixing of the bed, as well as reduced the outflow of solid materials due to the "splashing" of its surface.

The outflow of the solid was due, as mentioned above, to the "splashing" of the surface as well as to the flotating effect of the generated gas bubbles. If the solid content of the bed 4 is low, a gas bubble generated even in the lower part of the bed and attached to a solid particle is able to raise it, dodging the other bed particles to the upper part of the reactor, from where it ends up in the outlet solution. If the zinc content of the bed is high, it is able to prevent the dodging, and simultaneously the above-mentioned motion of the bed with its rubbing effect detaches the gas bubbles from the surface of the solid particle.

Figure 7:
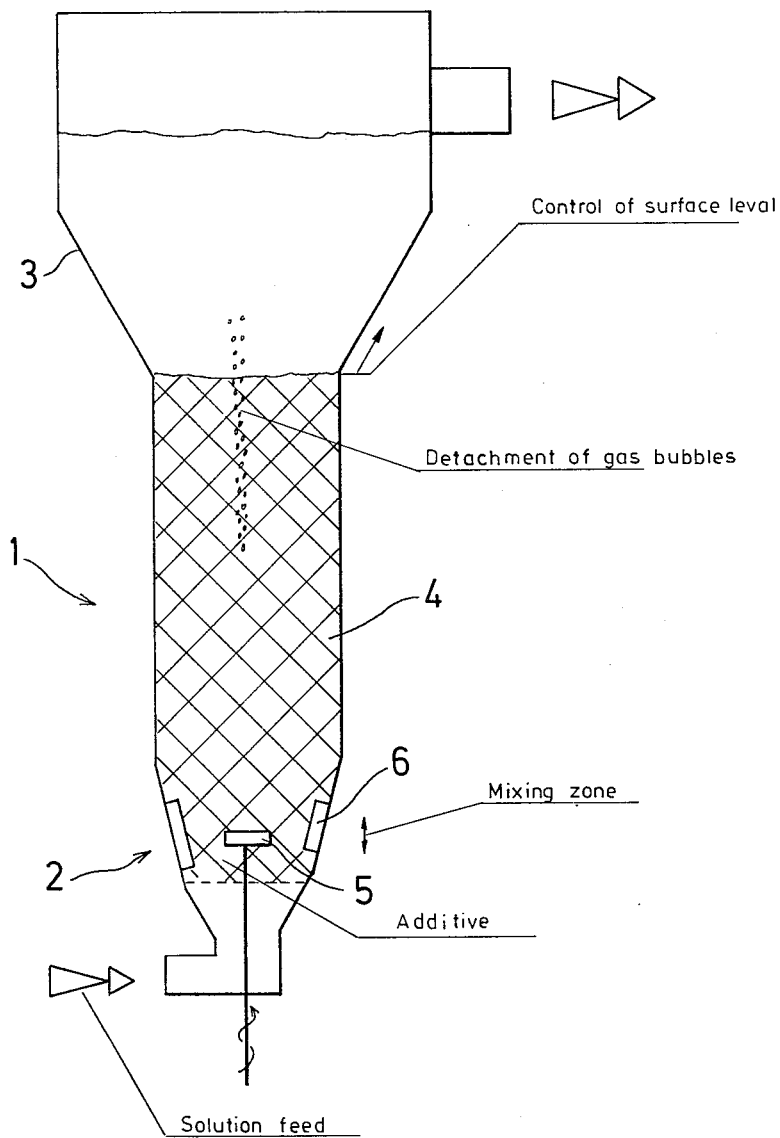

The set objectives were achieved with the device illustrated in FIG. 7 and the additive: high solid content in the bed, good solution exchange on solid surface, relatively simple structure, and small size. The problems caused by agglomeration and reaction gases were also overcome.

The reactor 1 shown in FIG. 7 has a lower part 2 which converges conically downwards and an upper part 3 which widens conically upwards. In the lower part 2 of the reactor 1 there is a crusher 5 and baffles 6 attached to the wall of the reactor 1. The fluidized bed is indicated by 4.

The solution feed into the reactor 1 takes place under the bed 4, and the solution is distributed as evenly as possible over the entire cross section of the reactor 1 by using either a grating, feed under the crushing propeller, several feed points, or the like.

In terms of reactor operation it is essential that when the reactor 1 is in operation a material which causes the Cd to precipitate in smooth-surfaced particles is present in the bed material. This reduces the agglomeration tendency.

The floor of the reaction chamber is shaped so that the proportion of poorly mixing areas is small (e.g., plane-like). Under optimal conditions the lower part of the reaction chamber widens conically, thereby providing an even distribution of the solution flow. The walls of the lower part 2 of the reactor have been provided with suitably arranged baffles 6 which have been meant to crush the agglomerates produced in the bed and simultaneously to prevent the pelleting of the bed. A low mixing area must be obtained with the energy requisite for crushing the agglomerates. Under optimal conditions it also keeps the lower part of the bed 4 in vigorous motion and its upper part in relatively weak rotating motion. The rotating motion provided the advantage that it evens the motion of the solid-bed surface, and the outflow of the solid caused by the "splashing" of the surface is thereby reduced and the reactor part above the bed can be shortened.

In the actual bed 4 the solid content is kept as high as possible, but so that the fluidized-bed conditions prevail therein. Owing to the additive, the high solid content in the bed, and its rubbing effect, the small gas bubbles generated in the reaction are detached from the surface of the solid in the bed 4. Their "frothing" effect is thereby weakened.

Under optimal conditions the reactor upper part 3 consists of a widening cone by which the surface level variations of the bed 4 are decreased. If it is desired that the reactor 1 be continuous-working even in relation to the solid, a solid feed into the bed and its removal by, for example, an overflow from the surface of bed 4 is required in addition to the above. A closed vessel, for example, prefilled with solution, can be used for the overflow arrangements.

The process according to the invention is described in more detail below with the help of examples.

EXAMPLE 1

50 kg of finely-ground zinc was batched into a device according to FIG. 7 and a cadmium sulfate containing zinc sulfate solution was fed through the reactor at a flow rate of 10.2 m$^3$/h. No flocculation agent was used in this experiment, only mixing. The bed was completely sintered in 30 minutes and stopped. An analysis of the bed indicated that it contained zinc 83.8 % and cadmium 8.7 %.

EXAMPLE 2

The same experiment was carried out as in Example 1, but this time a flocculation agent was used; 0.5 % Magnafloc high molecular weight polyacrylamide flocculant (manufacturer Allied Colloids) was added into the bed at a rate of 100 ml/min. The experiment was interrupted after about 7 hours, at which time the analysis was as follows:

Analysis

| Period (hours) | 1.5 | 3.5 | 5.5 | 7.5 |
|---|---|---|---|---|
| Zn % | 92.0 | 81.3 | 69.5 | 58.8 |
| Cd % | 7.8 | 17.3 | 28.0 | 39.0 |

EXAMPLE 3

50 kg of finely divided zinc was charged to each of four apparatuses according to FIG. 7, in series and a cadmium sulfate containing zinc sulfate solution was fed through the reactor series at a flow velocity of 10.2 m$^3$/h. Flocculating agent was added to the first reactor in an amount corresponding to the amount added in Example 2.

After 21 hours the experiment was stopped. In the first reactor the precipitate contained 94 % cadmium and 5 % zinc. During operation the cadmium content of the feed solution was about 300 mg/1 and the solution contained after the fourth reactor less than 0.1 mg cadmium per liter.

What is claimed is:

1. A process for separating from each other cadmium and zinc dissolved in water, by means of zinc as a cementation agent, in the presence of substantial amounts only of such materials as have a hydrogen overpotential greater than the potential difference between zinc and hydrogen gas; which comprises feeding a water solution containing cadmium and zinc into a reaction zone through a bed containing said cementation agent, crushing agglomerates produced in the cementation, and adding in to the reaction zone a high molecular weight polyacrylamide flocculation agent to cement cadmium in the form of smooth-surfaced particles which do not adhere to each other and from which particles gas bubbles are easily detached.

2. The process of claim 1 wherein said bed is relatively thick, wherein said water solution is fed upwards through said bed from below to fluidize said bed, and wherein said agglomerates sink from said bed and said crushing of said agglomerates is performed in a zone below said bed.

3. The process of claim 1 wherein said zinc as a cementation agent is added continuously to said reaction zone, and cementate produced is simultaneously removed.

4. The process of claim 3 wherein solid material and said water solution are fed countercurrently through the reaction zone.

5. The process of claim 3 wherein solid material and said water solution are fed countercurrently through several reaction zones.

* * * * *